US012696127B2

(12) United States Patent
Jayawardene et al.

(10) Patent No.: US 12,696,127 B2
(45) Date of Patent: Jul. 28, 2026

(54) DETECTING UTILIZATION OF SIGNAL REPEATER DEVICES TO OPTIMIZE NETWORK PERFORMANCE

(71) Applicant: Charter Communications Operating, LLC, St. Louis, MO (US)

(72) Inventors: Diwelawatte P. Jayawardene, Centennial, CO (US); Manthan Ashok Shah, Lone Tree, CO (US); Rajeev Aggarwal, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 411 days.

(21) Appl. No.: 18/455,278

(22) Filed: Aug. 24, 2023

(65) Prior Publication Data

US 2025/0071601 A1 Feb. 27, 2025

(51) Int. Cl.
| | |
|---|---|
| *H04W 28/02* | (2009.01) |
| *H04W 48/18* | (2009.01) |
| *H04W 76/19* | (2018.01) |
| *H04W 76/20* | (2018.01) |
| *H04W 76/22* | (2018.01) |

(52) U.S. Cl.
CPC ....... *H04W 28/0257* (2013.01); *H04W 48/18* (2013.01); *H04W 76/19* (2018.02); *H04W 76/20* (2018.02)

(58) Field of Classification Search
None
See application file for complete search history.

(56) References Cited

U.S. PATENT DOCUMENTS

| | | | |
|---|---|---|---|
| 7,778,596 B2 | 8/2010 | Anderson et al. | |
| 2021/0136674 A1* | 5/2021 | Lee | H04W 80/10 |
| 2022/0286895 A1* | 9/2022 | Lee | H04W 28/0257 |
| 2022/0386401 A1* | 12/2022 | Qiao | H04W 28/0215 |
| 2023/0030339 A1* | 2/2023 | Zhu | H04W 48/06 |
| 2025/0142463 A1* | 5/2025 | Wang | H04W 76/20 |
| 2025/0159498 A1* | 5/2025 | Thorat | G08G 5/55 |
| 2025/0184810 A1* | 6/2025 | Wu | H04L 12/1407 |
| 2025/0184942 A1* | 6/2025 | Chun | H04W 60/00 |

OTHER PUBLICATIONS

Notice of Allowance and Notice of Allowability for U.S. Appl. No. 18/455,321, dated May 28, 2026, 13 pages.

* cited by examiner

*Primary Examiner* — Jenee Holland
(74) *Attorney, Agent, or Firm* — Dority & Manning, P.A.

(57) ABSTRACT

Wireless signaling is received from a signal repeater device that repeats signaling originating from a network computing system. The wireless signaling comprises information indicating that the wireless signaling is being repeated. A message responsive to the wireless signaling to the network computing system, wherein the message comprises information indicating that signaling received by the UE is being repeated. A message is sent responsive to the wireless signaling to the network computing system that comprises information indicating that signaling received is being repeated. Information indicative of instructions to switch from a first network slice to a second network slice are received. A network slice switching process is performed to switch from the first network slice configured for a first maximum bitrate to the second network slice configured for a second maximum bitrate less than the first maximum bitrate.

20 Claims, 7 Drawing Sheets

DETECTING UTILIZATION OF SIGNAL REPEATER DEVICES TO OPTIMIZE NETWORK PERFORMANCE

BACKGROUND

Fifth Generation (5G) New Radio (NR) wireless networks have exhibited substantially greater performance than previous wireless network technologies, such as Fourth Generation (4G) Long-Term Evolution (LTE). For example, the maximum bandwidth provided by 5G NR networks is much higher than that of 4G LTE networks. Some of the performance increases provided by 5G NR networks can be attributed to the utilization of much higher frequency bands, such as those between 24-40 Ghz (also known as mmWave frequency bands). However, higher frequency bands generally suffer from lower effective ranges, thus requiring the utilization of additional hardware resources, such as signal repeaters, to increase the effective range of these frequency bands.

SUMMARY

A User Equipment (UE) can receive wireless signaling from a signal repeater device that originates from a network computing system. The UE can send a message to a network computing system indicating that signaling received by the UE is being repeated. The network computing system can instruct the UE to switch from a first network slice to a second network slice, and the UE can perform a network slice switching process to switch from a first network slice to a second network slice with more relaxed Quality of Service parameters.

In one example, a method is provided. The method includes receiving, by a UE comprising one or more processor devices, wireless signaling from a signal repeater device that repeats signaling originating from a network computing system, wherein the wireless signaling comprises information indicating that the wireless signaling is being repeated. The method includes sending, by the UE, a message responsive to the wireless signaling to the network computing system, wherein the message comprises information indicating that signaling received by the UE is being repeated. The method includes, responsive to sending the message to the network computing system, receiving, by the UE, information indicative of instructions to switch from a first network slice to a second network slice. The method includes performing, by the UE, a network slice switching process to switch from the first network slice to the second network slice, wherein the first network slice is configured for a first maximum bitrate, and wherein the second network slice is configured for a second maximum bitrate less than the first maximum bitrate.

In another example, a network computing system is provided. The network computing system includes one or more processor devices, wherein the one or more processor devices implement a plurality of network functions. The network computing system includes one or more tangible, non-transitory computer readable media storing computer-readable instructions that when executed by the one or more processor devices cause the one or more processor devices to perform operations. The operations include sending wireless signaling to a UE. The operations include receiving a response from the UE that is responsive to the wireless signaling, wherein the response comprises information indicating that signaling received by the UE is being repeated by a signal repeater device. The operations include, responsive to receiving the information, performing a network slice switching process to switch the UE from a first network slice to a second network slice, wherein the first network slice is configured for a first maximum bitrate, and wherein the second network slice is configured for a second maximum bitrate less than the first maximum bitrate.

In another example, one or more tangible, non-transitory computer readable media storing computer-readable instructions are provided. The one or more tangible, non-transitory computer readable media storing computer-readable instructions, when executed by one or more processor devices of a UE, cause the one or more processor devices to perform operations. The operations include receiving wireless signaling from a signal repeater device that repeats signaling originating from a network computing system, wherein the wireless signaling comprises information indicating that the wireless signaling is being repeated. The operations include sending a message responsive to the wireless signaling to the network computing system, wherein the message comprises information indicating that signaling received by the UE is being repeated. The operations include, responsive to sending the message to the network computing system, receiving information indicative of instructions to switch from a first network slice to a second network slice. The operations include performing a network slice switching process to switch from the first network slice to the second network slice, wherein the first network slice is configured for a first maximum bitrate, and wherein the second network slice is configured for a second maximum bitrate less than the first maximum bitrate.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
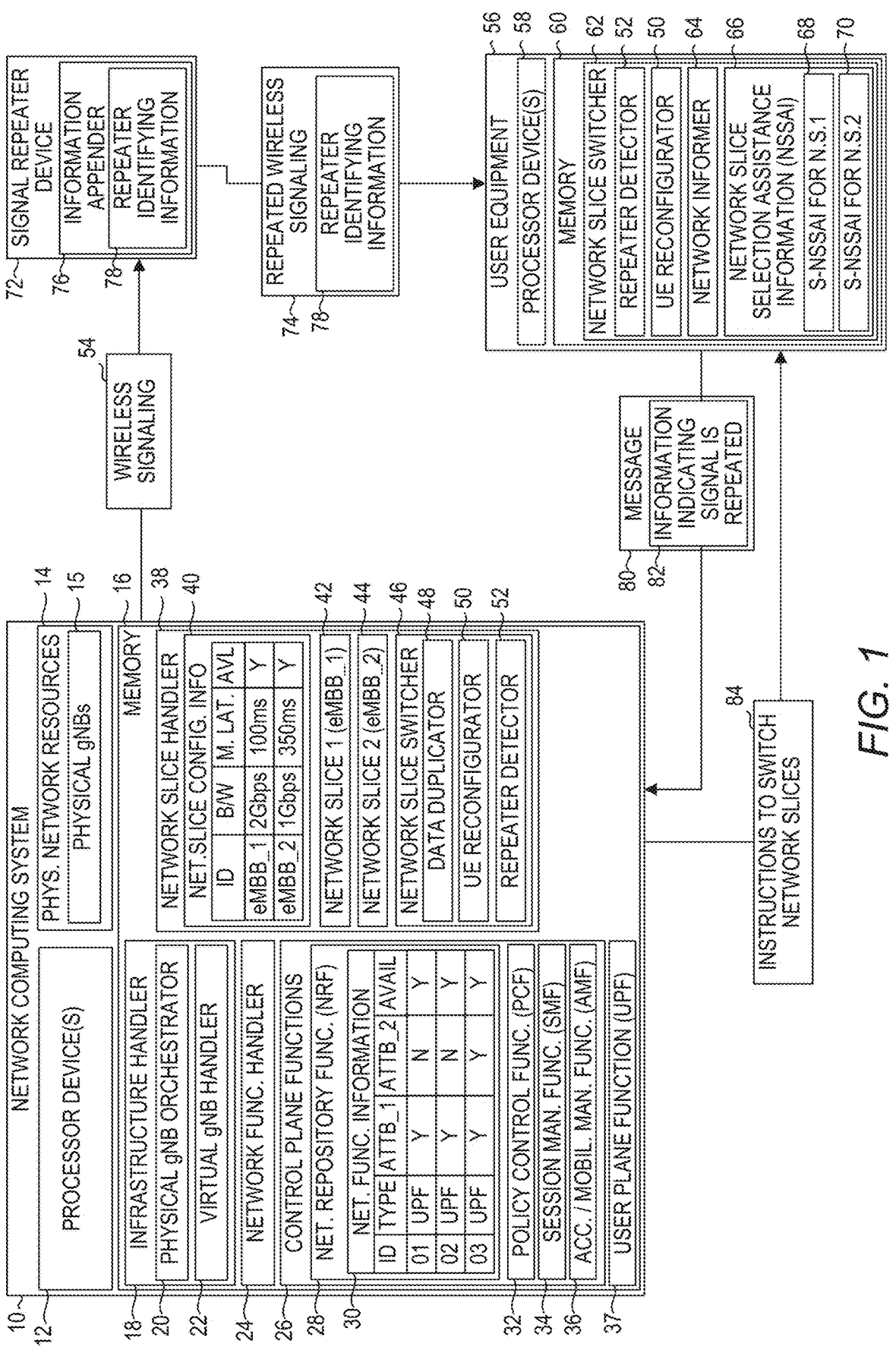
FIG. 1 is a block diagram of an environment suitable for detecting utilization of signal repeater devices to optimize network performance according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

As described previously, Fifth Generation (5G) New Radio (NR) wireless networks provide higher bandwidths than older wireless network technologies due to the utilization of much higher frequency bands. For example, a 5G NR base station, such as a gNodeB (gNB), can provide bandwidths of 2 Gbps on frequency ranges between 24-40 Ghz. However, one tradeoff with higher frequency bands is that they generally suffer from lower effective ranges. To remedy this deficiency, many 5G NR wireless networks utilize additional hardware resources, such as signal repeater devices, to increase the effective range of wireless signaling transmitted at these frequency bands.

However, many signal repeater devices cannot replicate the performance metrics of wireless signaling provided directly from base stations. Performance metrics, such as Quality of Service (QoS) parameters, can refer to throughput (e.g., bandwidth), latency, jitter, etc. For example, while a gNB may be able to provide wireless signaling with 2 Gbps wireless bandwidth, a signal repeater may only be capable of fluctuating between 1-2 Gbps at best. If a User Equipment (UE) (e.g., a smartphone, IoT device, wireless device, etc.) that is being served by the signal repeater device utilizes the same performance configuration used when being served directly by the gNB, additional loss of signal performance can occur. This can include packet loss, dropped connections, increased jitter, increased latency, etc.

These additional performance losses can be mitigated by modifying the configuration of a UE to correspond with QoS parameters that are achievable by the signal repeater device. To follow the previous example, if the configuration of the UE is modified to reflect a maximum bandwidth of 1 Gbps, rather than the 2 Gbps achievable by a gNB, some (or all) of the previously described performance loss can be reduced or eliminated.

One technique to modify the configuration of a UE to correspond with the QoS parameters of a signal repeater device is to switch the UE to a different network slice that implements such a configuration. More specifically, network slices are virtualized logical networks implemented by the same network infrastructure. Different network slices can be utilized to enable wireless signaling with QoS parameters that are specifically tailored for a certain use-case or scenario.

For example, a network slice instantiated to provide wireless signaling to IoT devices may include QoS parameters that maximize reliability for frequent transmissions of small quantities of data (e.g., sensor reporting information, etc.). Conversely, a network slice instantiated to provide high-throughput wireless signaling to user devices may include QoS parameters that maximize bandwidth for continuous streaming transmissions.

However, techniques to modify the configuration of a UE, such as switching the UE from one network slice to another, are difficult to implement because conventional network computing systems are unable to determine when a UE is being served directly or by a signal repeater device. This is due to signal repeater devices not being standardized within typical wireless standards bodies, such as the Third Generation Partnership Project (3GPP). As such, to reconfigure the UE, a wireless network computing system must first determine when a UE switches from being served directly by a gNB to being served by a signal repeater device.

Accordingly, implementations of the present disclosure propose detecting the utilization of signal repeater devices to optimize network performance. More specifically, a network computing system can send wireless signaling to a UE. A "network computing system" can generally refer to a collection of computing systems and/or devices that implements and orchestrates network infrastructure in a wireless network). The network computing system can include and/or orchestrate network nodes, physical base stations (i.e., gNBs), virtual base stations, etc., while also implementing multiple network functions. As such, the network computing system can send wireless signaling to the UE via one (or more) of the gNBs implemented by the network computing system.

Assume that the UE, while receiving the wireless signaling, moves within a particular range of a signal repeater device. Once within the range, the UE seamlessly switches to being served by the signal repeater device, thus indirectly receiving the wireless signaling from the network computing system after it is repeated by the signal repeating device.

When the wireless signaling is repeated by the signal repeater device, information can be appended to the wireless signaling indicating that the wireless signaling is being repeated by some signal repeater device. The UE can determine that the wireless signaling is being repeated based on this information and can send a message to the network computing system indicating that the wireless signaling received by the UE is being repeated.

In response, the network computing system can instruct the UE to switch from a first network slice configured for direct communication between the UE and gNB to a second network slice configured for communication mediated by a signal repeater device. For example, the first network slice may be configured for a high maximum bandwidth while the second network slice is configured for a reduced maximum bandwidth.

The UE and the network computing system can both perform a network slice switching process to switch the UE from the first network slice to the second network slice. In particular, the network computing system can utilize a variety of network functions to modify the configuration of the UE. Such modifications can cause the UE to switch from the first network slice to the second network slice. In such fashion, the involvement of a signal repeater device can be detected, and in response, the configuration of the UE can be modified to substantially reduce, or eliminate, the performance degradation associated with maintaining the same configuration when being served by a signal repeater device.

Aspects of the present disclosure provide a number of technical effects and benefits. As one example, when a UE switches from being served by a signal repeater device to being served directly by the gNB without modifying its configuration, the UE can experience substantial loss of signal performance, such as packet loss, dropped connections, increased jitter, increased latency, and reduced bandwidth. This loss of signal performance can be mitigated by modifying the configuration of the UE. However, the configuration of the UE cannot be modified until it is first determined that the UE is being served by the signal repeater device. As such, by detecting that a signal repeater device is being utilized and then modifying the configuration of the UE, implementations of the present disclosure effectively and efficiently mitigate, or eliminate, the loss of signal performance associated with being served by a signal repeater device.

FIG. 1 is a block diagram of an environment suitable for detecting utilization of signal repeater devices to optimize network performance according to some implementations of the present disclosure. A network computing system 10 includes processor device(s) 12 and memory 16. In some implementations, the network computing system 10 may be a computing system that includes multiple computing devices. Alternatively, in some implementations, the network computing system 10 may be one or more computing devices within a computing system that includes multiple computing devices. Similarly, the processor device(s) 12 may include any computing or electronic device capable of executing software instructions to implement the functionality described herein.

The network computing system 10 can orchestrate a wireless network by implementing, managing, handling, etc. various software and/or hardware resources that collectively implement the wireless network. For example, the network computing system 10 can implement network functions or instances of network functions, such User Plane Functions (UPFs), control plane functions (e.g., Session Management Functions (SMFs), Accessibility & Mobility Management Functions (AMFs), etc.).

For another example, the network computing system 10 can include physical network resources 14. The physical network resources 14 can include any type of device, computing device, computing system, networking device or infrastructure, etc. Specifically, the physical network resources 14 can include physical base stations, such as gNBs implemented by physical network resources (e.g., transmitters, receivers, multiplexers, computing device(s), data cables, etc.), switches, modems, etc. The network computing system 10 can orchestrate the physical network resources 14. For example, if the physical network resources 14 include a gNB, the network computing system 10 may orchestrate the gNB to implement multiple network slices, network functions, etc.

In particular, the physical network resources 14 can include a plurality of physical gNBs 15. The physical gNBs 15 can be base stations and/or network nodes that are physically located within a geographic environment to provide wireless services to UEs. The physical gNBs 15 can be any type or manner of base station or network node, and can include hardware and/or software resources sufficient to exchange and/or orchestrate network functions and services to enable the exchange of wireless signaling between the physical gNB and UEs served by the physical gNB.

The memory 16 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 16 can include a containerized unit of software instructions (i.e., a "packaged container"). The containerized unit of software instructions can collectively form a container that has been packaged using any type or manner of containerization technique.

For example, such a containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 16 can include an infrastructure handler 18. The infrastructure handler 18 can be a collection of software and/or hardware resources (e.g., such as the physical network resources 14, etc.) that manage network infrastructure overseen by the network computing system 10. To do so, the infrastructure handler 18 can include a physical gNB orchestrator 20. Physical base stations are base stations that are not virtualized. In other words, physical base stations are implemented with various hardware resources that collectively form the physical base station. Such physical base stations are generally referred to as gNBs in the context of 5G networks. The physical gNB orchestrator 20 can orchestrate physical gNBs by instructing the gNBs to perform various tasks, such as implementing network functions, providing wireless services to UEs, implementing multiple virtualized gNBs, etc.

The infrastructure handler 18 can include a virtual gNB handler 22. The virtual gNB handler 22 can instantiate and manage multiple virtual gNBs (i.e., virtual base stations). For example, the virtual gNB handler 22 may instantiate additional virtual gNBs in response to predicted or determined increases in network demand. Conversely, the virtual gNB handler 22 may de-instantiate virtual gNBs in response to predicted or determined reductions in network demand. To instantiate or otherwise manage virtual gNBs, the virtual gNB handler 22 can allocate the physical network resources 14 for instantiation of the virtual gNBs.

The memory 16 can include a network function handler 24. The network function handler 24 can instantiate, implement, and de-instantiate network functions to provide wireless networking services. In particular, the network function handler 24 can handle both control plane functions and user plane functions. In some implementations, the network function handler 24 can instantiate multiple instances of the same network function. For example, the network function handler 24 may instantiate a certain core network function and assign that instance of the core network function to a specific network slice. If another network slice is created, the network function handler 24 can instantiate another instance of the same core network function and assign that instance of the core network function to the other network slice.

The memory 16 can include control plane functions 26. The control plane functions 26 can include any type or manner of network function associated with the control plane as specified by prior, current, or future wireless standards, such as those published by the Third Generation Partnership Project (3GPP). In addition, the control plane functions 26 can include multiple instances of some (or all) of the control plane functions described herein. In particular, it should be noted that the network functions described herein are at least capable of providing the functionality described by the 3GPP, or any successive wireless standards organizations.

The control plane functions 26 can include a network repository function (NRF) 28. The NRF 28 serves as an "index" that can be consulted by other network functions to discover or retrieve information related to other entities present in the core of the network implemented with the network, as well as certain capabilities associated with such entities. More generally, the NRF 28 can store network function information 30. The network function information 30 can store information descriptive of each instance of control plane functions currently instantiated by the network function handler 24. To follow the depicted example, for multiple instances of a User Plane Functions (UPFs), the network function information 30 can indicate an identifier for the instance, whether the instance of the UPF includes certain attributes, and whether the instance of the UPF is available. However, the network function information 30 can include information related to any aspect or characteristic of a network function or an instance of a network function.

The control plane functions 26 can include a Policy Control Function (PCF) 32. The PCF 32 can support a unified policy framework to govern network behavior by providing policy rules for control plane functions (e.g., network slicing, roaming, mobility management, etc.) and subscription information for the policy decisions taken, and by supporting new 5G quality of service policy and charging control functions. For example, the PCF 32 can implement end-to-end policy management from UEs to applications. For another example, the PCF 32 can define specific policies for different network slices to support different 5G use-cases (e.g., as Enhanced Mobile Broadband (EMBB), Ultra-Reli- able and Low-Latency Communication (URLLC), Internet- of-Things (IOT), etc.).

The control plane functions 26 can include a Session Management Function (SMF) 34. The SMF 34 can generally be responsible for interacting with the data plane, managing Protocol Data Unit (PDU) sessions, and managing session context with user plane functions. In particular, the SMF 34 can collect information related to PDU session management from various network components (e.g., the PCF 32, etc.) and can orchestrate those network components based on requests received from an accessibility/mobility manage- ment function.

The control plane functions 26 can include an Accessi- bility/Mobility Management Function (AMF) 36. Generally, the AMF 36 can serve as an "access point" to the core of the network implemented by the network computing system 10 and can handle Non-Access Stratum (NAS) messages received from UE (e.g., via Radio Access Network (RAN), etc.). In particular, the AMF 36 can handle tracking, regis- tration, management, authorization, etc. of network connec- tions. In addition, the AMF 36 can manage access to subscribed services as devices are switched from being served by one base station to another.

The memory 16 can include a User Plane Function (UPF) 37. The UPF 37 can generally serve as an "interconnect" point between the mobile infrastructure and the data net- work. In particular, the UPF 37 can handle packet routing and forwarding, application detection (e.g., using Service Data Flow (SDF) traffic filters), QoS handling, traffic mod- eration for idle devices, serving as an anchor point for mobility between Radio Access Technologies (RATs), etc. In some implementations, the UPF can be a virtual network function that offers high-performance forwarding for user traffic.

The memory 16 can include a network slice handler 38. The network slice handler 38 can generally manage network slices, including resource allocation, instantiation, manage- ment, reporting, de-instantiation, etc. The network slice handler 38 can include network slice configuration informa- tion 40. The network slice configuration information 40 can describe a current state, and/or various characteristics, of prior or current network slices instantiated by the network slice handler 38. However, it should be noted that the network slice configuration information 40 can indicate any other aspect or characteristic of the network slices imple- mented by the network slice handler 38. For example, the network slice configuration information 40 may include, for a particular network slice, values for certain parameters in the configuration for the network slice, an assigned purpose for the network slice (e.g., an eMBB slice vs an IoT slice, etc.), the number of UEs being served by the network slice, various capabilities of the network slice, etc.

For example, the network slice handler can instantiate a first network slice 42 and a second network slice 44. The network slice configuration information 40 can indicate that the first network slice 42 has a maximum bandwidth of 2 Gigabits per second (Gbps) while the second network slice 44 has a maximum bandwidth of 1 Gbps. The network slice configuration information 40 can further indicate that the first network slice 42 has a maximum latency of 100 Milliseconds (ms) while the second network slice 44 has a maximum latency of 350 ms. Finally, the network slice configuration information 40 can indicate a current avail- ability of each network slice, as in some instances, a particular network slice may be unavailable (e.g., due to current or predicted load, lack of available resources for allocation, etc.).

The memory 16 can include a network slice switcher 46. The network slice switcher 46 can perform a network slice switching process to switch a UE from the first network slice 42 to the second network slice 44. To do so, the network slice switcher 46 can include a data duplicator 48. The data duplicator 48 can duplicate data being exchanged between a UE and the network computing system 10 when the UE is being switched from the first network slice 42 to the second network slice 44. For example, if a bitstream is being provided to the UE via the first network slice, the data duplicator 48 can duplicate the bitstream and send the duplicated bitstream to the UE over the second network slice. In this manner, the UE can seamlessly transition between network slices without service interruptions or missing packets.

The network slice switcher 46 can include a UE recon- figurator 50. The UE reconfigurator 50 can reconfigure UE configurations to cause, or otherwise assist, the UE to switch from the first network slice 42 to the second network slice 44. For example, if the UE includes Network Slice Selection Assistance Information (NSSAI), the UE reconfigurator 50 can modify the NSSAI to cause the UE to switch from the first network slice 42 to the second network slice 44. As a more specific example, the UE may include Single NSSAI (S-NSSAI) information that describes the first network slice. The UE reconfigurator 50 may modify the UE to add S-NSSAI information that describes the second network slice. Alternatively, the UE reconfigurator 50 may modify the S-NSSAI on the UE that describes the first network slice to instead describe the second network slice.

The network slice switcher 46 can include a repeater detector 52. The repeater detector 52 can detect when wireless signaling being broadcast by a gNB of the network computing system (e.g., physical network resources 14, etc.) is repeated using a signal repeater device before being received by a UE. To do so, the repeater detector 52 can, after broadcasting wireless signaling, receive information from the target of the wireless signaling that indicates the wireless signaling was repeated before reception. Based on the information, the repeater detector 52 can determine that the wireless signaling is being repeated.

The network computing system 10 can provide wireless signaling 54 to a UE 56. The wireless signaling 54 can be any type of uplink or downlink signaling across any type or manner of wireless channel. For example, the wireless signaling 54 can be wireless downlink signaling over a physical channel (e.g., a Physical Downlink Control Channel (PDCCH), a Physical Downlink Shared Channel (PDSCH), etc.). For another example, the wireless signaling 54 can be wireless uplink signaling. For yet another example, the wireless signaling 54 can be information conveyed via various network functions (e.g., one or more of the control plane functions 26, the UPF 37, etc.).

The UE 56 can be any type or manner of device or collection of devices with the capability to directly or indirectly receive wireless signaling, such as a smartphone, an IoT device, a computing device, a laptop, a vehicle, a wearable device, a smart sensor, etc. In some implementations, the UE 56 can include processor device(s) 58 as described with regards to the processor device(s) 12 of the network computing system 10. In some implementations, the UE 56 can include a memory 60 as described with regards to the memory 16 of the network computing system 10.

The memory 60 of the UE can include a network slice switcher 62. The network slice switcher 62 can be similar, or identical, to the network slice switcher 46 of the network computing system 10, and can fulfill the same purpose in performing a network slice switching process to switch the UE from the first network slice 42 to the second network slice 44. For example, the network slice switcher 62 can include the repeater detector 52, or a repeater detector analogous to the repeater detector 52, that detects when wireless signaling from the network computing system 10 is repeated by a signal repeater device prior to the UE 56 receiving the wireless signaling. For another example, the network slice switcher 62 can include the UE reconfigurator 50, or a UE reconfigurator analogous to the UE reconfigurator 50, that can reconfigure the UE 56 so that the UE 56 switches from the first network slice 42 to the second network slice 44.

In addition, the network slice switcher 62 can include a network informer 64 and NSSAI 66. The network informer 64 can generate information indicating that wireless signaling 54 received at the UE 56 is being received indirectly from a signal repeater device that is repeating the wireless signaling 54.

The NSSAI 66 can include information descriptive of the first network slice 42 and the second network slice 44. For example, the NSSAI 66 may include Single-NSSAI (S-NSSAI) 68 for the first network slice 42. The S-NSSAI 68 can uniquely identify the first network slice 42. In some implementations, the S-NSSAI 68 can include two (or more) portions of information: a Slice/Service Type (SST) for the first network slice 42 and a Slice Differentiator (SD) for the first network slice 42. The SST can define the expected behavior for the first network slice 42 in terms of specific features and services (e.g., maximum bandwidth, maximum latency, QoS parameters, etc.). The SD can be or otherwise include some manner of identifier for the first network slice 42. The NSSAI 66 can also include S-NSSAI 70 for the second network slice 44. The S-NSSAI 70 can include the same information for the second network slice 44 as described with regards to the S-NSSAI 68.

The network computing system 10 can detect that the wireless signaling 54 is being repeated and, in response, can cause the UE 56 to switch from the first network slice 42 to the second network slice 44. To follow the depicted example, assume that the UE 56 is exchanging wireless signaling with a gNB (e.g., physical gNB 15) of the network computing system 10 via the first network slice 42 while traversing a city. While traversing, the UE 56 may be moved to a location where the UE 56 would be better served by a signal repeater device 72 than the network computing system 10. In response, the UE 56 can automatically begin being served by the signal repeater device 72. This transition can be managed by the network computing system 10 using control plane functions 26, physical network resources 14, infrastructure handler 18, etc.

The signal repeater device 72 can be any type or manner of device that receives wireless signaling and re-broadcasts, or otherwise "boosts," the effective area of the wireless signaling. More generally, the signal repeater device 72 can serve as a "black box" intermediary that relays information between gNBs of the network computing system 10 and the UE 56 to extend the range of the gNBs of the network computing system 10.

In many instances, signal repeater devices such as the signal repeater device 72 are non-standardized devices that do not repeat wireless signaling in accordance with any particular wireless standards body. As such, the signal repeater device 72 may not have access to a standardized method of communication to communicate with the network computing system 10 and/or the UE 56 (e.g., to identify the signal repeater device 72, to inform the network computing system 10 that the signal repeater device 72 is repeating the wireless signaling 54, etc.). As such, in these instances, the network computing system 10 and/or the UE 56 must detect that the signal repeating device 72 is repeating wireless signaling received by the UE 56.

Because the UE 56 is being served by the signal repeater device 72, the wireless signaling 54 can be received at the signal repeater device 72 before being received by the UE 56. In other words, the UE 56 can receive repeated wireless signaling 74 from the signal repeater device 72, rather than the wireless signaling 54 directly from the gNB of the network computing system.

In some implementations, the signal repeater device 72 can assist the network computing system 10 and/or the UE 56 in detecting that the wireless repeated wireless signaling 74 is the wireless signaling 54 being repeated by the signal repeater device 72. To do so, the signal repeater device 72 can include an information appender 76. The information appender 76 can append repeater identifying information 78 to the wireless signaling 54, or can otherwise communicate the repeater identifying information 78 to the UE 56. If the repeater identifying information 78 is appended to the repeated wireless signaling 74, the UE 56 can receive the repeater identifying information 78 concurrently with the repeated wireless signaling 74. Otherwise, the UE 56 can receive the repeater identifying information 78 at some other point, either directly from the signal repeater device 72 or in some other manner (e.g., via a network function of the network computing system, etc.).

In some implementations, the repeater identifying information 78 can simply indicate that the repeated wireless signaling 74 is being repeated. In some implementations, if the wireless signaling 54 is downlink control signaling (e.g., PDSCH signaling, PDCCH signaling, etc.), the information appender 76 can insert a preamble to the downlink control signaling that includes the repeater identifying information 78. For example, the repeater identifying information 78 can be formatted as $R_n$_BeamID$_n$, where $R_n$ can be an identifier for the signal repeater device 72, and n can be the beam ID number that is being repeated (e.g., the beam ID number that identifies the wireless signaling 54). Additionally, in some implementations, the repeater identifying information 78 can further identify the specific signal repeater device 72 as being the device responsible for repeating the repeated wireless signaling 74.

Based on the repeater identifying information 78, the UE 56 can determine that the wireless signaling 54 is being repeated by the signal repeater device 72 with the repeater detector 52. In response, the UE 56 can provide a message 80 to the network computing system 10. The message 80 can include information 82 indicating that the repeated wireless signaling 74 received at the UE 56 is wireless signaling that is being repeated by some signal repeater device. In some implementations, the information 82 can include some, or all, of the repeater identifying information 78, or can otherwise be derived from the repeater identifying information 78.

The network computing system 10 can determine that the wireless signaling 54 is being repeated based on the message 80 received from the UE 56 using the repeater detector 52. In response, the network computing system 10 can utilize the network slice switcher 46 to switch the UE 56 from the first network slice 42 to the second network slice 44. In addition, the network computing system 10 can provide instructions 84 to switch network slices to the UE 56. In such fashion, the network computing system 10 and the UE 56 can both perform the network slice switching process.

As depicted, the second network slice 44 can be configured with QoS parameters that require less performance than those configured for the first network slice 42. For example, the QoS parameters for the second network slice 44 may indicate a max bandwidth of 1 Gbps, while the QoS parameters for the first network slice may indicate a max bandwidth of 2 Gbps. As described previously, a network slice enforcing QoS parameters that cannot be fulfilled by a signal repeater device can cause significant signal quality degradation. As such, by switching the UE to a network slice with reduced QoS parameters, the network computing system 10 can ensure that provision of wireless services to the UE 56 is less likely to experience performance degradation. The process performed by the network computing system 10 and the UE 56 to switch from the first network slice 42 to the second network slice 44 will be discussed in greater detail with regards to FIGS. 2A-2B.

Figure 2A:
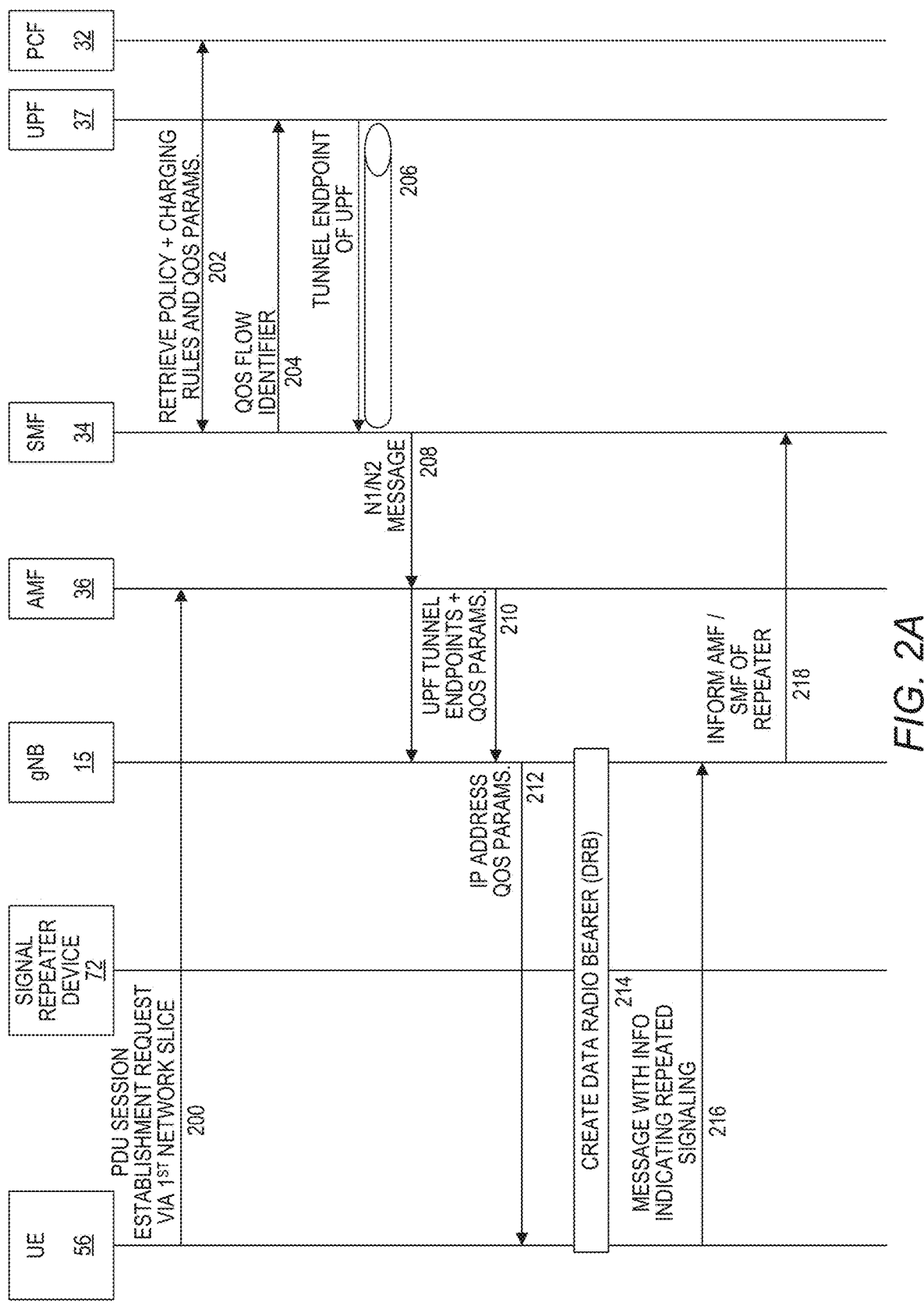
FIG. 2A is a data flow diagram for a network slice switching process to switch the User Equipment (UE) from the first network slice to the second network slice according to some implementations of the present disclosure.

FIG. 2A is a data flow diagram for a network slice switching process to switch the UE 56 from the first network slice 42 to the second network slice 44 according to some implementations of the present disclosure. FIG. 2A will be discussed in conjunction with FIG. 1. In particular, at 200, the UE 56 can provide a PDU session establishment request to the AMF 36. For example, the UE 56 may first register with the gNB 15. Following registration, the UE 56 can then provide the PDU session establishment request.

At 202, the SMF 34 can retrieve policy rules, charging rules, and QoS parameters. For example, the SMF 34 can retrieve policy and charging rules from the PCF 32. For another example, the SMF 34 may retrieve QoS parameters from the PCF 32 or from the UPF 37. In addition, the SMF 34 can, in some implementations, provide the policy and charging rules and/or the QoS parameters to the UPF 37.

At 204, the SMF 34 can provide a QoS flow identifier to the UPF 37. The QoS flow identifier can identify the QoS flow for the PDU session established responsive to the PDU session establishment request provided by the UE 56 to the AMF 36 at 200. In some implementations, the SMF at this instance can select the UPF 37 as being the UPF for the established PDU session.

At 206, the UPF 37 can create a tunnel endpoint ID. The tunnel endpoint ID can serve as one "end" of a tunnel between the gNB 15 and the UPF 37. The UPF 37 can provide the tunnel endpoint ID to the SMF 34, which can provide the tunnel endpoint ID to the gNB 15. Alternatively, the UPF 37 can provide the tunnel endpoint ID directly to the gNB 15.

At 208, the SMF can provide an N1/N2 message to the AMF 36. The N1/N2 message can include both the N1 message, which can be for eventual receipt by the UE 56, and the N2 message, which can be for eventual receipt by the gNB 15. The N1 message can be, or otherwise include, a session management NAS message, PDU session establishment accept message, etc. The N2 message can carry N3 tunnel information, QoS flow information, etc.

At 210, the AMF 36 can forward the N1/N2 message to the gNB 15. In addition, the AMF 36 can provide the UPF tunnel endpoint generated at 206, and the QoS flow information from the SMF 34.

At 212, the gNB can forward an IP address and QoS parameters to the UE. The IP address, and the QoS parameters, can be established by the SMF 34 and communicated to the gNB at 208/210.

At 214, the gNB 15, in conjunction with the UE 56, can create a Data Radio Bearer (DRB) utilizing the QoS parameters and the IP address. The DRB can serve as a connection between the UE 56 and the Next-Generation Radio Access Network (NG-RAN) implemented at least partially by the gNB 15.

At 212 or 214, the UE 56 can receive some wireless signaling indirectly from the gNB 15 after being repeated by the signal repeater device 72. The signal repeater device 72 can include the repeater identifying information 78 as described with regards to FIG. 1.

At 216, the UE 56 can provide a message to the gNB 15 via the signal repeater device 72 (e.g., sending the message to the signal repeater device 72 which the signal repeater device 72 relays to the gNB 15).

At 218, the gNB 15 can decode the message provided by the UE 56 to identify the presence of the signal repeater device 72. The gNB 15 can inform the AMF 36 of the presence of the signal repeater device 72. More specifically, the gNB 15 can inform the AMF 36 that wireless signaling being provided by the gNB to the UE 56 is being repeated by the signal repeater device 72 prior to receipt of the wireless signaling by the UE 56. For example, the gNB can update the AMF 36 on an N2 interface, and in conjunction with the AMF 36, initiate network slice switching (i.e., modification) due to the detected signal repeater device 72. In some implementations, the gNB 15 can also inform the SMF 34 of the signal repeater device 72. Alternatively, in some implementations, the AMF 36 can forward the information from the gNB 15 to the SMF 34 to inform the SMF 34 of the signal repeater device 72.

Alternatively, in some implementations, the AMF 36 can receive instructions from the gNB 15 to connect to the UE 56 directly over the control plane. The UE 56 can then inform the AMF 36 directly regarding the signal repeater device 72 (e.g., via NR-NR DC mode userplane, etc.).

Figure 2B:
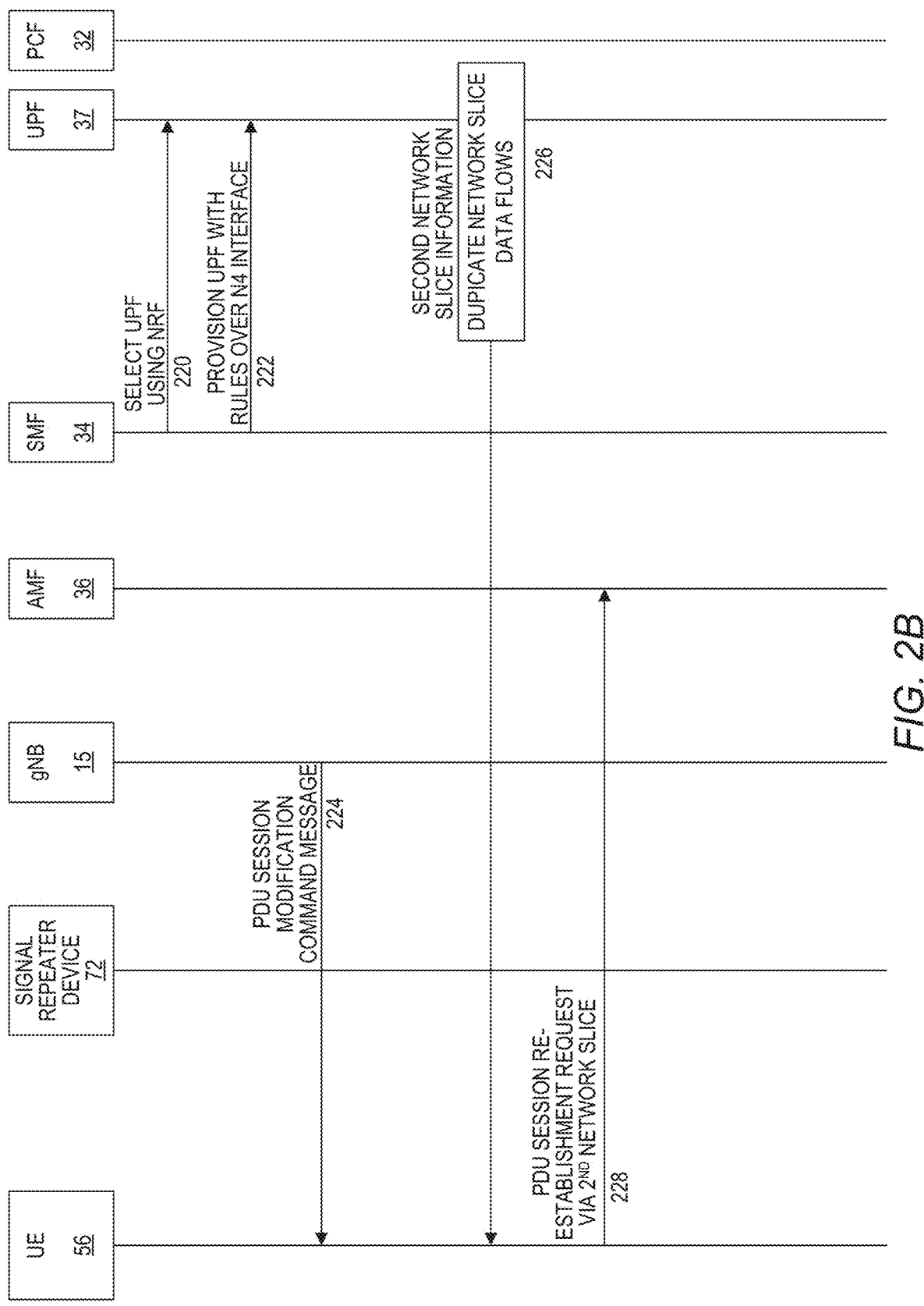
FIG. 2B continues the network slice switching process of FIG. 2A to switch the UE from the first network slice to the second network slice according to some implementations of the present disclosure.

Turning to FIG. 2B, FIG. 2B continues the network slice switching process of FIG. 2A to switch the UE 56 from the first network slice 42 to the second network slice 44 according to some implementations of the present disclosure. FIG. 2B will be discussed in conjunction with FIG. 1. At 220, the SMF 34 can select the PCF 32 using the NRF 28 as described with regards to FIG. 1 and retrieve additional charging rules and QoS parameters for network slice modification.

At 222, the SMF 34 can provision the UPF with the policy and charging rules over an N4 interface to initiate switching of the UE 56 from the first network slice 42 to the second network slice 44. The policy and charging rules can be provided via a Packet Forwarding Control Protocol (PFCP) establishment request. In some implementations, the SMF 34 can include S-NSSAI 70 in the PFCP establishment request. The S-NSSAI 70 can include the SD for the second network slice 44. The Packet Detection Rules (PDRs) can be used by the UPF 37 to process incoming packets. The PDRs can include, for example, a precedence value, packet detection information, forwarding action rule, quality enforcement rules, usage reporting rules, buffering action rules, etc.

At 224, the gNB can send a message to the UE 56 that includes a PDU session modification command message. In some implementations, the PDU session modification command message can be a NAS session management message that is received from the SMF 34. In some implementations, if the UE 56 has established a Radio Resource Control (RRC) connection with the gNB 15, the UE 56 can receive a RRC reconfiguration message from the gNB 15 that includes the PDU session modification command message.

At 226, the UPF 37 can provide information descriptive of the second network slice 44 to the UE 56. In addition, the UPF 37 can duplicate data flows being communicated with the UE 56 across the first network slice 42 so that the data flows are also being communicated to the UE 56 across the second network slice 44. In this manner, the UPF 37 can ensure that the UE 56 doesn't experience signal degradation or loss of information from switching network slices.

At 228, the UE can perform session re-establishment on the second network slice 44. In such fashion, the UE 56 and the gNB 15 (or the network computing system 10 that orchestrates the gNB 15) can conjunctively perform the network slice switching process to switch the UE 56 from the first network slice 42 to the second network slice 44.

Figure 3A:
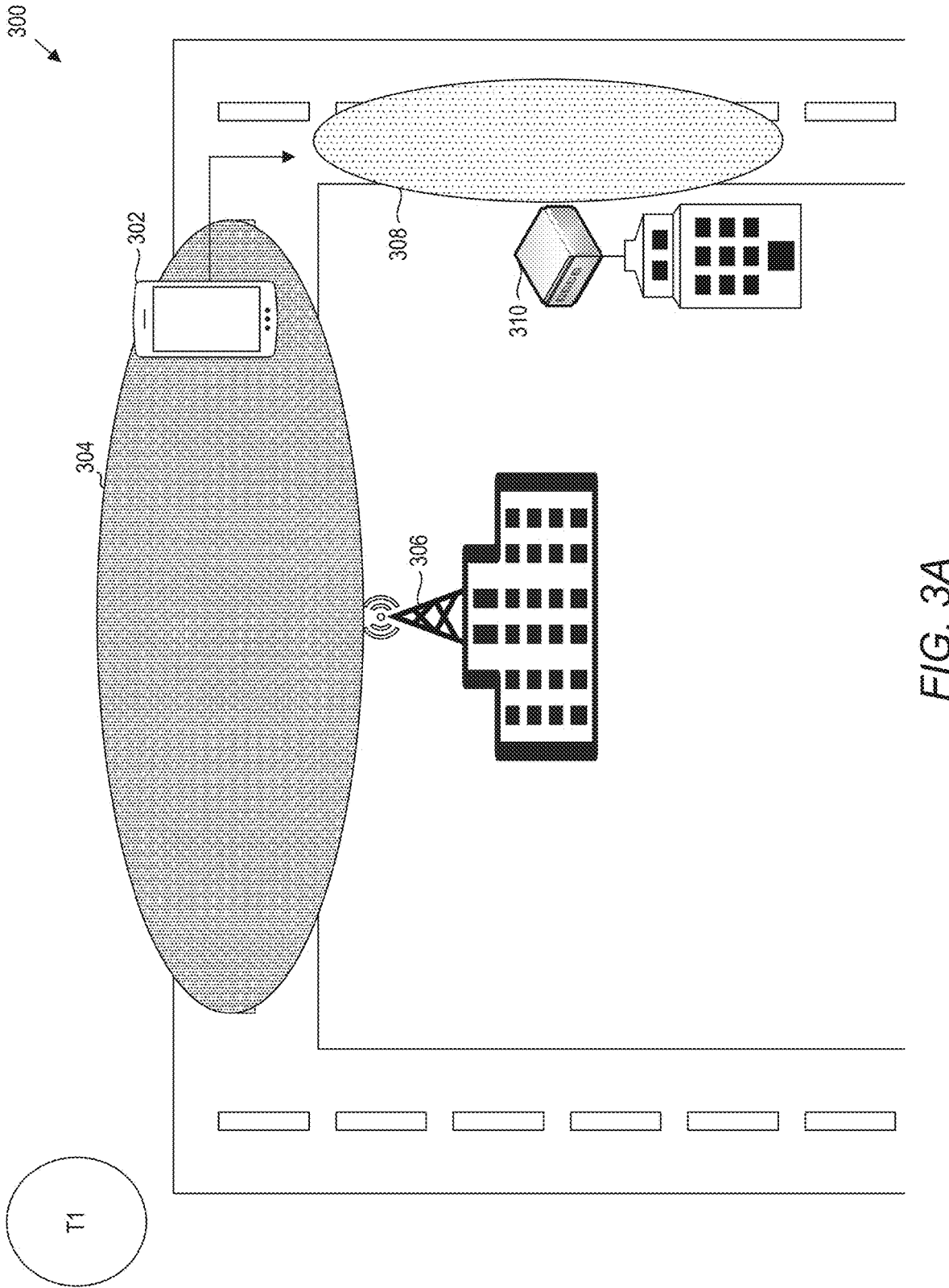
FIGS. 3A-3B illustrate an example scenario that can cause network switching according to some implementations of the present disclosure.
Figure 3B:
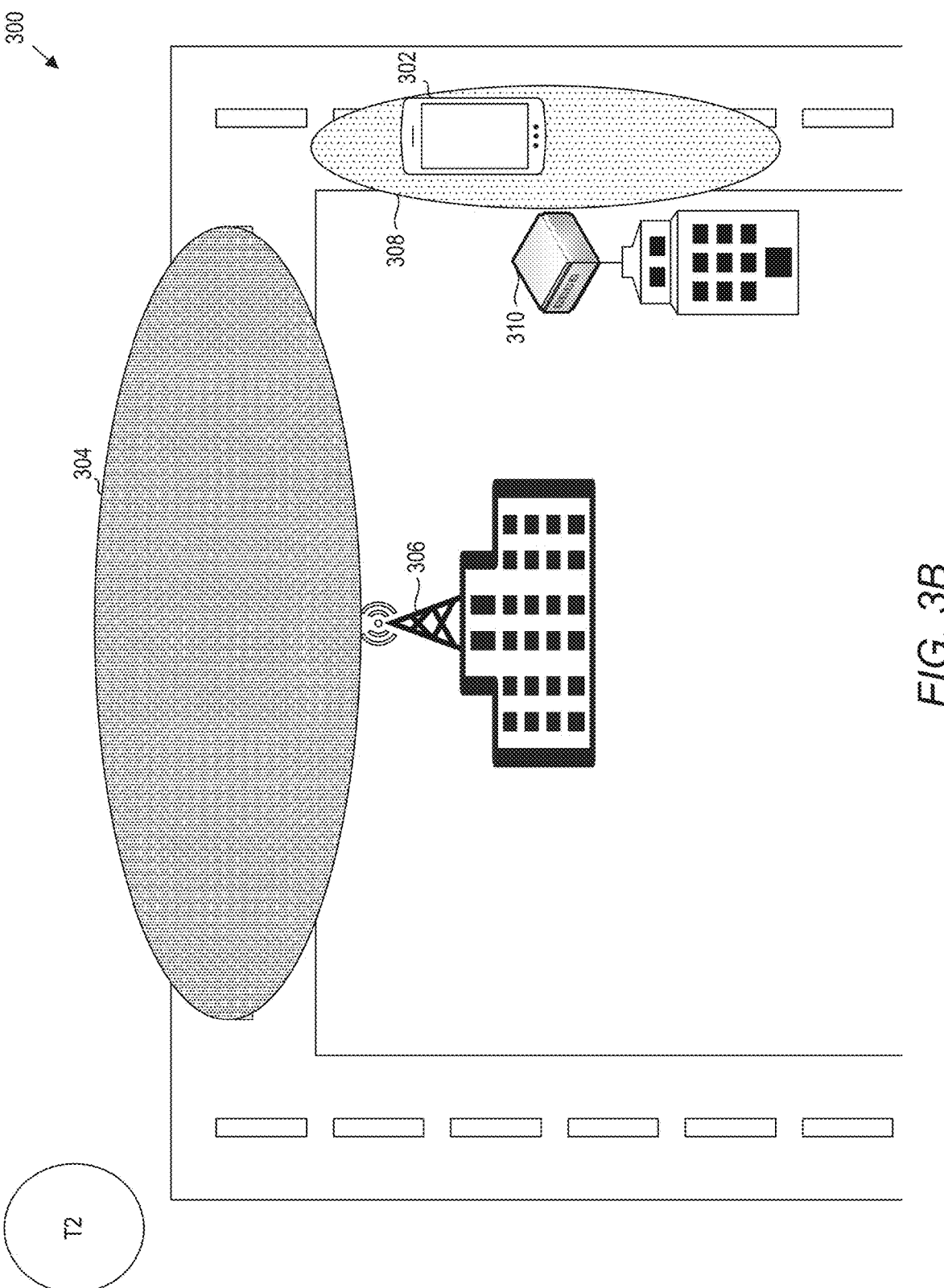

FIGS. 3A-3B illustrate an example scenario that can cause network switching according to some implementations of the present disclosure. Specifically, turning to FIG. 3A, at a first time T1 a UE 302 can traverse a city block 300. At the time T1, the UE 302 can be within a wireless coverage area 304 produced by a gNB 306. For example, the gNB 306 can be a wireless base station that enables the exchange of wireless signaling with UEs within the wireless coverage area 304. The wireless coverage area 304 can be an area in which the gNB 306 can provide a certain degree of wireless signaling coverage to UEs such as the UE 302.

Turning to FIG. 3B, at a second time T2 subsequent to time T1, the UE 302 can traverse to a different area of the city block. Specifically, as depicted, the UE 302 has moved from being located within the wireless coverage area 304 of the gNB 306 to being located within a wireless coverage area 308 of a signal repeater device 310. The signal repeater device 310 can be a device that repeats wireless signaling provided by the gNB 306. For example, although the signal repeater device 310 is not illustrated as being located within the wireless coverage area 304 produced by the gNB 306, the signal repeater device 310 can still receive wireless signaling from the gNB 306 due to its proximity to the gNB 306 and the lack of obstructions between the gNB 306 and the signal repeater device 310 (e.g., due to the height at which the devices are mounted).

The signal repeater device 310 can produce the wireless coverage area 308. Because the signal repeater device 310 serves as an intermediary that relays information between the gNB 306 and the UE 302, the wireless coverage 308 can serve as an "extension" of the wireless coverage area 304. However, the wireless coverage area 308 produced by the signal repeater device 310 can carry signaling with different performance capabilities than the signaling carried in the wireless coverage area 304 produced by the gNB 306. As such, when the UE 302 relocates from being within the wireless coverage area 304 produced by the gNB 306 to being within the wireless coverage area 308, the gNB 306 can detect the presence of the signal repeater device 310 and can switch the UE 302 from a first network slice to a second network slice.

Figure 4:
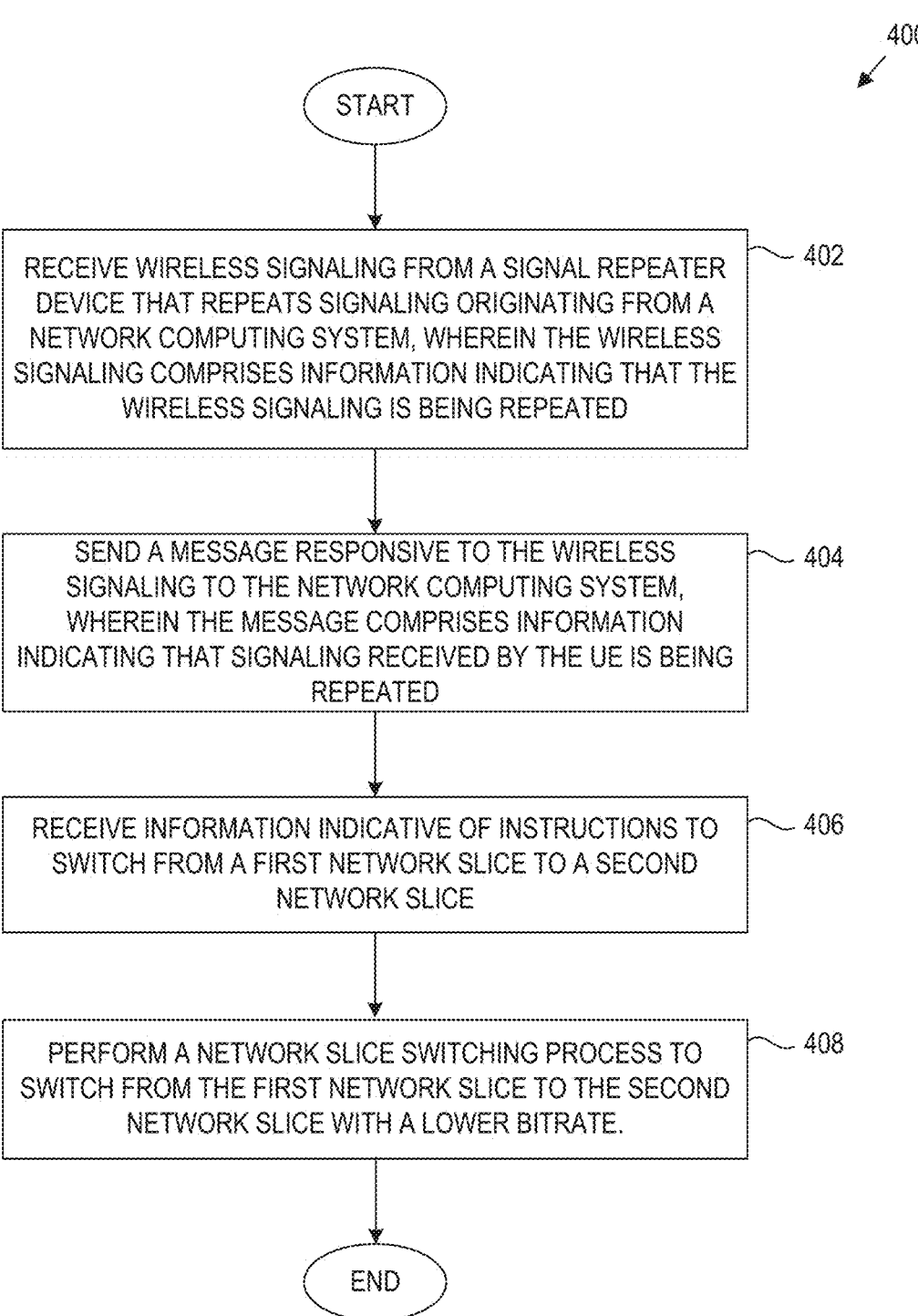
FIG. 4 depicts a flow chart diagram of an example method to perform a network slice switching process with a UE to switch the UE from a first network slice to a second network slice according to some implementations of the present disclosure.

FIG. 4 depicts a flow chart diagram of an example method to perform a network slice switching process with a UE to switch the UE from a first network slice to a second network slice according to some implementations of the present disclosure. Although FIG. 4 depicts operations performed in a particular order for purposes of illustration and discussion, the methods of the present disclosure are not limited to the particularly illustrated order or arrangement. The various operations of the method 400 can be omitted, rearranged, combined, and/or adapted in various ways without deviating from the scope of the present disclosure.

At operation 402, a UE can receive wireless signaling from a signal repeater device that repeats signaling originating from a network computing system. The wireless signaling can include information indicating that the wireless signaling is being repeated.

In some implementations, receiving the information indicative of the instructions to switch from the first network slice to the second network slice can include receiving, from the network computing system, a PDU session release command.

In some implementations, receiving the information indicative of the instructions to switch from the first network slice to the second network slice can include receiving a UE configuration update command message that modifies a NSSAI of the UE. The UE configuration update command message can be received via an AMF implemented by the network computing system.

In some implementations, receiving the wireless signaling from the signal repeater device can include receiving physical downlink channel signaling that includes a preamble. The preamble can indicate that the wireless signaling is being repeated, and the preamble can include an identifier for the signal repeater device. In some implementations, the physical downlink channel signaling can be PDCCH signaling. Alternatively, in some implementations, the physical downlink channel signaling can be PDSCH signaling. Additionally, or alternatively, in some implementations, the preamble can further include a beam identifier for the wireless signaling.

At operation 404, the computing system can send a message responsive to the wireless signaling to the network computing system. The message can include information indicating that signaling received by the UE is being repeated.

At operation 406, responsive to sending the message to the network computing system, the UE can receive information indicative of instructions to switch from a first network slice to a second network slice.

At operation 408, the computing system can perform a network slice switching process to switch from the first network slice to the second network slice. The first network slice can be configured for a first maximum bitrate. The second network slice can be configured for a second maximum bitrate less than the first maximum bitrate.

In some implementations, performing the network slice switching process to switch from the first network slice to the second network slice can include providing a session re-establishment request to the network computing system, and switching from the first network slice to the second network slice. In some implementations, switching from the first network slice to the second network slice includes receiving a RRC reconfiguration message from the network computing system. The RRC message can include a NAS PDU session modification command message.

In some implementations, the UE can further receive additional wireless signaling from the network computing system. The additional wireless signaling can be received directly from the network computing system, and the additional wireless signaling can include information indicative of instructions to switch from the second network slice to the first network slice. The UE can perform the network slice switching process to switch from the second network slice to the first network slice.

Figure 5:
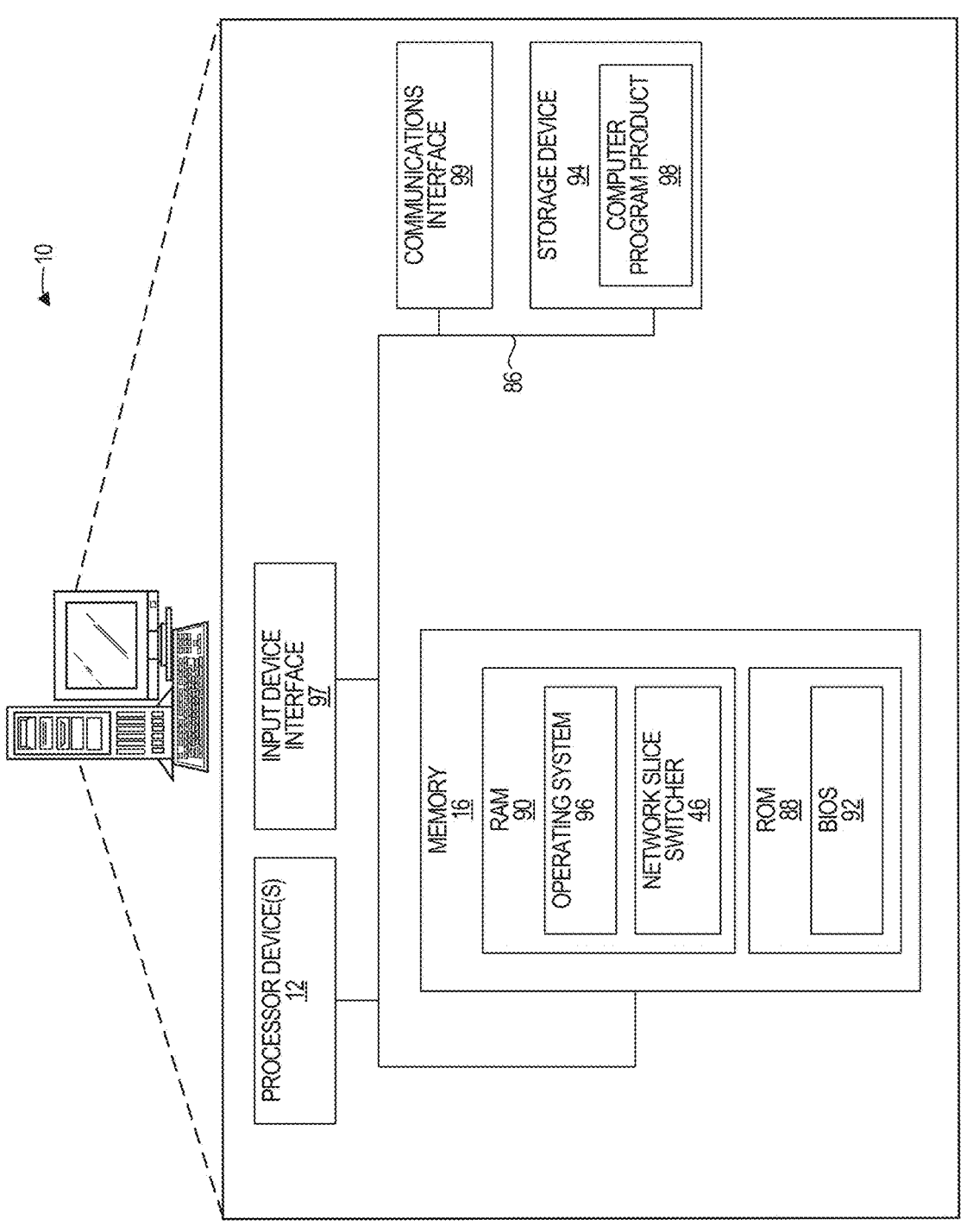
FIG. 5 is a block diagram of the network computing system suitable for implementing examples according to one example.

FIG. 5 is a block diagram of the network computing system 10 suitable for implementing examples according to one example. The network computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The network computing system 10 includes the processor device(s) 12, the system memory 16, and a system bus 86. The system bus 86 provides an interface for system components including, but not limited to, the system memory 16 and the processor device(s) 12. The processor device(s) 12 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The system memory 16 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 90 and can include the basic routines that help to transfer information between elements within the network computing system 10. The volatile memory 90 may also include a high-speed RAM, such as static RAM, for caching data.

The network computing system 10 may further include or be coupled to a non-transitory computer-readable storage medium such as the storage device 94, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 94 and other drives associated with computer-readable media and computer-usable media may provide non-volatile storage of data, data structures, computer-executable instructions, and the like.

A number of modules can be stored in the storage device 94 and in the volatile memory 90, including an operating system 96 and one or more program modules, such as the network slice switcher 46, which may implement the functionality described herein in whole or in part. All or a portion of the examples may be implemented as a computer program product 98 stored on a transitory or non-transitory computer-usable or computer-readable storage medium, such as the storage device 94, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the network slice switcher 46 in the volatile memory 90, may serve as a controller, or control system, for the network computing system 10 that is to implement the functionality described herein.

Because the network slice switcher 46 is a component of the network computing system 10, functionality implemented by the network slice switcher 46 may be attributed to the network computing system 10 generally. Moreover, in examples where the network slice switcher 46 comprises software instructions that program the processor device(s) 12 to carry out functionality discussed herein, functionality implemented by the network slice switcher 46 may be attributed herein to the processor device(s) 12.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 97 that is coupled to the system bus 86 but can be connected by other interfaces such as a parallel port, an Institute of Electrical and Electronic Engineers (IEEE) 1394 serial port, a Universal Serial Bus (USB) port, an IR interface, and the like. The network computing system 10 may also include the communications interface 99 suitable for communicating with the network as appropriate or desired. The network computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a User Equipment (UE) comprising one or more processor devices, wireless signaling from a signal repeater device that repeats signaling originating from a network computing system, wherein the wireless signaling comprises information indicating that the wireless signaling is being repeated;

sending, by the UE, a message responsive to the wireless signaling to the network computing system, wherein the message comprises information indicating that signaling received by the UE is being repeated;

responsive to sending the message to the network computing system, receiving, by the UE, information indicative of instructions to switch from a first network slice to a second network slice; and performing, by the UE, a network slice switching process to switch from the first network slice to the second network slice, wherein the first network slice is configured for a first maximum bitrate, and wherein the second network slice is configured for a second maximum bitrate less than the first maximum bitrate.

2. The method of claim 1, wherein performing the network slice switching process to switch from the first network slice to the second network slice comprises:

providing, by the UE, a session re-establishment request to the network computing system; and switching, by the UE, from the first network slice to the second network slice.

3. The method of claim 2, wherein switching from the first network slice to the second network slice comprises:

receiving, by the UE, a Radio Resource Control (RRC) reconfiguration message from the network computing system, wherein the RRC message comprises a Non-Access Stratum (NAS) Protocol Data Unit (PDU) session modification command message.

4. The method of claim 1, wherein receiving the information indicative of the instructions to switch from the first network slice to the second network slice comprises:

receiving, by the UE from the network computing system, a PDU session release command.

5. The method of claim 1, wherein receiving the information indicative of the instructions to switch from the first network slice to the second network slice comprises:

receiving, by the UE, a UE configuration update command message that modifies a Network Slice Selection Assistance Information (NSSAI) of the UE, wherein the UE configuration update command message is received via an Access and Mobility Management Function (AMF) implemented by the network computing system.

6. The method of claim 1, wherein the method further comprises:

receiving additional wireless signaling from the network computing system, wherein the additional wireless signaling is received directly from the network computing system, and wherein the additional wireless signaling comprises information indicative of instructions to switch from the second network slice to the first network slice; and performing the network slice switching process to switch from the second network slice to the first network slice.

7. The method of claim 1, wherein receiving the wireless signaling from the signal repeater device comprises:

receiving physical downlink channel signaling comprising a preamble, wherein the preamble indicates that the wireless signaling is being repeated, and wherein the preamble comprises an identifier for the signal repeater device.

8. The method of claim 7, wherein receiving the physical downlink channel signaling comprising the preamble comprises:

receiving Physical Downlink Control Channel (PDCCH) signaling comprising the preamble.

9. The method of claim 7, wherein receiving the physical downlink channel signaling comprising the preamble comprises:

receiving Physical Downlink Shared Channel (PDSCH) signaling comprising the preamble.

10. The method of claim 7, wherein the preamble further comprises a beam identifier for the wireless signaling.

11. A network computing system, comprising:

one or more processor devices, wherein the one or more processor devices implement a plurality of network functions;

one or more tangible, non-transitory computer readable media storing computer-readable instructions that when executed by the one or more processor devices cause the one or more processor devices to perform operations, the operations comprising:

sending wireless signaling to a User Equipment (UE);

receiving a response from the UE that is responsive to the wireless signaling, wherein the response comprises information indicating that signaling received by the UE is being repeated by a signal repeater device; and responsive to receiving the information, performing a network slice switching process to switch the UE from a first network slice to a second network slice, wherein the first network slice is configured for a first maximum bitrate, and wherein the second network slice is configured for a second maximum bitrate less than the first maximum bitrate.

12. The network computing system of claim 11, wherein performing the network slice switching process to switch the UE from the first network slice to the second network slice comprises:

sending, to the UE, information comprising instructions to switch from the first network slice to the second network slice.

13. The network computing system of claim 12, wherein sending the information comprising the instructions to switch from the first network slice to the second network slice comprises:

sending, to the UE, a UE configuration update command message that modifies a NSSAI of the UE, wherein the UE configuration update command message is sent via an AMF implemented by the network computing system.

14. The network computing system of claim 12, wherein performing the network slice switching process to switch the UE from the first network slice to the second network slice further comprises:

querying, with a Session Management Function (SMF) a Network Repository Function (NRF) to select a Policy Control Function (PCF), wherein the plurality of network functions comprises the SMF, NRF, and PCF; and using the PCF to retrieve policy rules, charging rules, and Quality of Service (QoS) parameters.

15. The network computing system of claim 14, wherein performing the network slice switching process to switch the UE from the first network slice to the second network slice further comprises:

using the SMF to send a Packet Forwarding Control Protocol (PFCP) establishment request to the UE, wherein the PFCP establishment request comprises the policy rules, the charging rules, and Single-NSSAI (S-NSSAI) information corresponding to the second network slice.

16. The network computing system of claim 15, wherein performing the network slice switching process to switch the UE from the first network slice to the second network slice further comprises:

sending, to the UE, a RRC reconfiguration message comprising a NAS PDU session modification command message;

selecting a User Plane Function (UPF) via the SMF; and provisioning one or more Packet Detection Rules (PDRs) for the UPF, wherein the one or more PDRs comprises at least one of:

a precedence value;

packet detection information;

forwarding action rule(s);

quality enforcement rule(s);

usage reporting rule(s); or buffering action rule(s).

17. The network computing system of claim 15, wherein performing the network slice switching process to switch the UE from the first network slice to the second network slice further comprises:

sending, to the UE, a PDU session release command.

18. The network computing system of claim 11, wherein the operations further comprise:

sending additional wireless signaling to the UE;

determining that the additional wireless signaling is received directly by the UE without being repeated by a signal repeating device;

providing, to the UE, information indicative of instructions to switch from the second network slice to the first network slice; and performing the network slice switching process to switch the UE from the second network slice to the first network slice.

19. One or more tangible, non-transitory computer readable media storing computer-readable instructions that when executed by one or more processor devices of a User Equipment (UE), cause the one or more processor devices to perform operations, the operations comprising:

receiving wireless signaling from a signal repeater device that repeats signaling originating from a network computing system, wherein the wireless signaling comprises information indicating that the wireless signaling is being repeated;

sending a message responsive to the wireless signaling to the network computing system, wherein the message comprises information indicating that signaling received by the UE is being repeated;

responsive to sending the message to the network computing system, receiving information indicative of instructions to switch from a first network slice to a second network slice; and performing a network slice switching process to switch from the first network slice to the second network slice, wherein the first network slice is configured for a first maximum bitrate, and wherein the second network slice is configured for a second maximum bitrate less than the first maximum bitrate.

20. The one or more tangible, non-transitory computer readable media of claim 19, wherein performing the network slice switching process to switch from the first network slice to the second network slice comprises:

providing a session re-establishment request to the network computing system; and switching from the first network slice to the second network slice.

* * * * *